United States Patent [19]

Park et al.

[11] Patent Number: 4,604,362
[45] Date of Patent: Aug. 5, 1986

[54] GAS-LIQUID REACTOR AND A METHOD FOR REACTING LIQUIDS AND GASES

[75] Inventors: Jin Y. Park, Moscow; Barry H. O'Brien, Idaho Falls; Woo G. Lee, Moscow, all of Id.

[73] Assignee: Research Corporation, New York, N.Y.

[21] Appl. No.: 691,246

[22] Filed: Jan. 14, 1985

[51] Int. Cl.[4] .......................................... G01N 33/50
[52] U.S. Cl. ........................................ 436/34; 422/64; 422/72
[58] Field of Search ....................... 422/72, 64; 436/34

[56] References Cited

U.S. PATENT DOCUMENTS

| | | |
|---|---|---|
| 356,247 | 1/1887 | Harwood . |
| 737,003 | 8/1903 | McKnight . |
| 859,427 | 7/1907 | Brandenburg . |
| 951,452 | 3/1910 | Prims . |
| 1,040,981 | 10/1912 | Hunt . |
| 1,662,602 | 3/1928 | Donkelberg . |
| 2,153,640 | 4/1939 | Podbielniak . |
| 2,189,230 | 2/1940 | Sheldon et al. . |
| 2,551,815 | 5/1951 | Schulz . |
| 2,619,280 | 11/1952 | Redlich ................... 422/72 |
| 3,346,033 | 10/1967 | Olejniczak . |
| 4,314,968 | 2/1982 | Guigan . |

OTHER PUBLICATIONS

Chapter 5 of "Gas-Liquid-Solid Reactor Design", by Yatish T. Shah, published by McGraw-Hill International Book Company.

Primary Examiner—Frank Sever
Attorney, Agent, or Firm—Scully, Scott, Murphy & Presser

[57] ABSTRACT

A gas-liquid reactor comprising an outside containment vessel and an inside reaction vessel rotatably supported within the outside containment vessel. A liquid is conducted into the inside reaction vessel, and that vessel is rotated to force the liquid therein against a wall of the reaction vessel and into a film having a stable and geometrically simple shape. A gas is also conducted into the inside reaction vessel to react with the liquid therein. Because of the stable and simple shape of the liquid, the reactions between the liquid and gases are relatively easy to analyze quantitatively.

26 Claims, 7 Drawing Figures

GAS-LIQUID REACTOR AND A METHOD FOR REACTING LIQUIDS AND GASES

BACKGROUND OF THE INVENTION

The present invention relates to gas-liquid reactors, and more particularly to a gas-liquid reactor that is especially well suited for use as an experimental laboratory reactor.

Experimental laboratory reactors are often used to study chemical processes involving gas and liquid reactants, as well as those requiring the presence of a solid component, in order to obtain a complete and thorough understanding of those processes. Such an understanding, for instance, is essential in order to efficiently design and use large scale commercial facilities in which these chemical processes occur. Even in reactors specifically designed to study these reactions, however, it is often extremely difficult to obtain accurate reaction data for many gas-liquid and gas-liquid-solid chemical reactions because gas-liquid interfaces are normally very unstable. This instability, which is primarily caused by ripples, waves, and other phenomena that disrupt the surface of the liquid, makes it very difficult to predict and to calculate the precise area of the gas-liquid interface and, thus, to analyze quantitatively these reactions.

Various other factors also contribute to the accuracy of data obtained from experiments conducted in gas-liquid or gas-liquid-solid reactors. For example, even if the gas-liquid interface is stable, the accuracy with which the size of the interface can be calculated depends on the shape thereof, and thus it is desirable that the gas-liquid interface be geometrically simple. At the same time, the accuracy with which the fluid mechanics of the liquid in contact with the gas can be determined, affects the data obtained from the reactor. Also, the uniformity of the bulk gas and liquid compositions in the reactor has an impact on the accuracy of the information obtained therefrom, with the accuracy of that information increasing with the uniformity of the bulk compositions of the fluids in the reactor.

A variety of experimental laboratory reactors have been developed and used in the past. These include the falling film reactor, the single-sphere reactor, and the multiple-sphere reactor. In a falling film reactor, a thin film of liquid flows down a vertical tube while a gas is passed upward or downward over the liquid surface. The thin liquid film is inherently unstable, though, and ripples and waves easily form on the film. When this occurs, the precise size of the interface between the liquid and the gas and the fluid mechanics of the liquid film flow are very difficult, if not practically impossible, to predict and to analyze accurately.

In a single sphere reactor, a liquid flows over the surface of a sphere. The stability of the liquid film in a single sphere reactor is somewhat better than in a falling film reactor. However, even in a single sphere reactor, the liquid film is still less stable than what is normally desired because of the gas flow past the film, and it is very difficult to agitate the gas in a single-sphere reactor without introducing unacceptable instability in the liquid film.

In a multiple sphere reactor, the gas and liquid flow over the surfaces of a string of spheres. The liquid film in such a reactor is subject to all the stability limitations present in the single sphere reactor. In addition, in a multiple sphere reactor, the fluid mechanics of the liquid flow are extremely complicated due to the presence of pockets of liquid between adjacent spheres. Moreover, the compositions of both the liquid and the gas vary significantly along the path of the flow of those fluids through the reactor.

SUMMARY OF THE INVENTION

An object of this invention is to form and to maintain a liquid film having a very stable and geometrically simple surface area in a gas-liquid reactor by subjecting the liquid film to a strong centrifugal force field.

Another object of the present invention is to use centrifugal forces in a rotating reactor vessel to force liquid therein against an inside surface of the vessel and into a thin film having a simple and stable shape.

A further object of this invention is to employ the rotating action of a gas-liquid reactor to pump liquid through the reactor, to recirculate liquid therethrough, and to mix the liquid continuously to maintain the bulk composition of that liquid uniform.

Still another object of the present invention is to mix vigorously the gas in a gas-liquid reactor without affecting the stability of the liquid surface in the reactor.

These and other objectives are attained with a gas-liquid reactor comprising an outside containment vessel and an inside reaction vessel. A liquid is conducted into the inside reaction vessel, and that vessel is rotated to force the liquid therein against a surface of the inside reaction vessel and into a thin film having a stable and geometrically simple shape. A gas is also conducted into the inside reaction vessel to react with the liquid therein. Because of the stable and simple shape of the liquid, the reactions between the liquid and gasses are relatively easy to analyze quantitatively.

The outside containment vessel and the inside reaction vessel form a liquid passage for conducting liquid into the inside reaction vessel. In a first embodiment, liquid is conducted into the liquid passage near the bottom of the outside containment vessel, and impeller means pumps the liquid upward through the liquid passage and into the inside reaction vessel. With another embodiment, the outside containment vessel includes a liquid flow guide separating the liquid passage into inside and outside portions, and impeller means are provided to draw liquid from the inside portion of the liquid passage and direct that liquid outward through a central opening in the liquid flow guide and into the outside portion of the liquid passage.

Further benefits and advantages of the invention will become apparent from a consideration of the following detailed description, given with reference to the accompanying drawings, which specify and show preferred embodiments of the invention.

A BRIEF DESCRIPTION OF THE DRAWINGS

A DETAILED DESCRIPTION OF THE PREFERRED EMBODIMENTS

Figure 1:
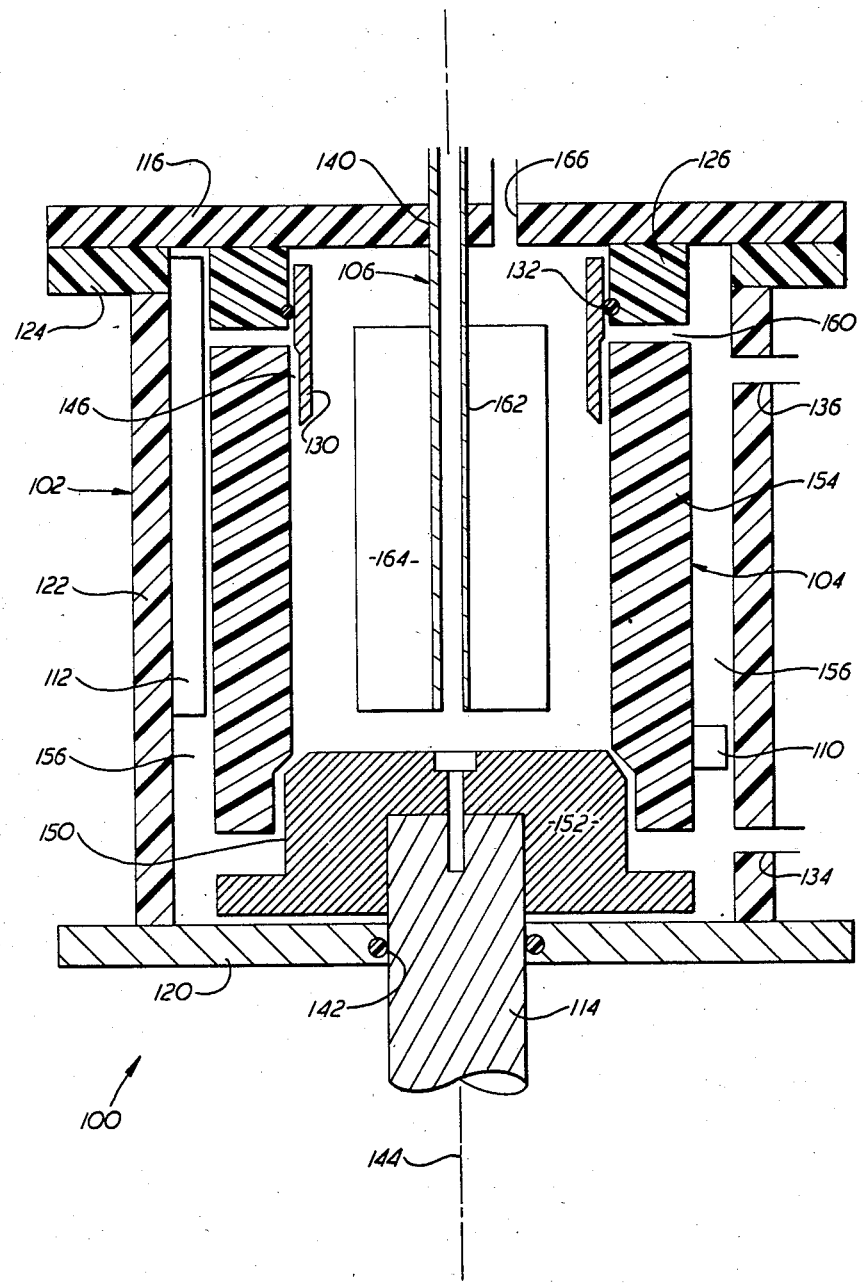
FIG. 1 is an axial cross-sectional view through a reactor illustrating one embodiment of the present invention.

FIG. 1 shows reactor 100, which generally comprises outside containment vessel 102, inside reaction vessel 104, gas conduit means 106, impeller means 110, baffle means 112, and drive means 114. Outside containment vessel 102 is provided to house and support various other parts of reactor 100, specifically inside reaction vessel 104, gas conduit means 106, impeller means 110, and baffle means 112. As illustrated in FIG. 1, outside containment vessel 102 includes top plate 116, bottom plate 120, cylindrical side wall 122, outside and inside upper rings 124 and 126, liquid guide means 130, and seal 132.

Top and bottom plates 116 and 120 have circular shapes, are substantially the same size, and, in assembly, are positioned parallel to and axially aligned with each other. Sidewall 122 has a generally cylindrical shape and extends upward from bottom plate 120 coaxial therewith, and outside upper ring 124 fits between the top of sidewall 122 and top plate 116 coaxial therewith. Top plate 116, bottom plate 120, sidewall 122, and outside ring 124 may be connected together in any suitable manner to form a strong, secure housing for inside reaction vessel 104 and the chemical reactions occurring therein. For instance, a plurality of bolts (not shown) may be axially extended through radially outside portions of plates 116 and 120 to connect those plates securely together and to clamp sidewall 122 and upper ring 124 therebetween.

Plates 116 and 120, sidewall 122, and ring 124 form a substantially enclosed housing; however, liquid inlet 134 and liquid outlet 136 are provided in outside containment vessel 102, specifically sidewall 122 thereof. Liquid outlet 136, it should be noted, is at a higher level than liquid inlet 134 and is annularly displaced relative thereto. Also, central opening 140 is located in top plate 116 for gas conduit means 106, and drive opening 142 is provided in bottom plate 120 for drive means 114. A cooling jacket (not shown) may be added around containment vessel 102 to facilitate controlling the temperature of reactor 100.

Preferably, at least sidewall 122 is formed from a transparent material such as plexiglass to permit visual observation of the interior thereof. Top plate 116 may also be formed from a transparent material, again such as plexiglass, to facilitate that visual observation. Alternately, containment vessel 102 may be made from a material such as stainless steel to allow operations at higher temperatures and pressures.

Inside reaction vessel 104 is supported within outside containment vessel 102 for rotation about axis 144—preferably the axis of plates 116 and 120—and the inside reaction vessel includes liquid inlet 146 and liquid outlet 150 for conducting liquids into and out from the interior of the inside reaction vessel. With the embodiment of the invention illustrated in FIG. 1, reaction vessel 104 has a generally u-shaped lateral cross section, including base 152 and cylindrical sidewall 154 extending upward relative to the base. Base 152 and sidewall 154 are slightly spaced apart and connected together by a plurality of mitered bars. These mitered bars are slightly spaced from each other, forming, in combination with base 152 and sidewall 154, liquid outlets 150. Alternately, it should be noted, base 152 and sidewall 154 may be integrally formed together as a one piece unit, with outlets 150 made by drilling or otherwise machining appropriate openings through inside reaction vessel 104.

Inside reaction vessel 104 preferably is transparent to allow visual observation of the liquid-gas reactions occurring therein, and the reaction vessel may be formed from acrylic. Alternately, reaction vessel 104 may be made from a material, for example stainless steel, which would permit operations at greater pressures and temperatures. Bearings (not shown) may be located above and below reaction vessel 104 to improve the stability of that vessel as it rotates within outside containment vessel 102. Preferably, in use, vessel 104 is rotated about a vertical axis, although, with modifications within the ability of those of ordinary skill in the art, the inside reaction vessel may be rotated about a horizontal axis without departing from the scope of this invention.

Outside containment vessel 102 and inside reaction vessel 104 form a liquid passage 156 for conducting liquid from liquid inlet 134 of the containment vessel to liquid inlet 146 of the reaction vessel, and also from liquid outlet 150 of the reaction vessel to the liquid inlet thereof. With the particular shapes, sizes and positions of containment vessel 102 and reaction vessel 104 shown in FIG. 1, liquid passage 156 has a generally cylindrical shape, although other shapes may be used in the practice of this invention.

Impeller means 110 is secured to inside reaction vessel 104 for rotation therewith and extends therefrom into fluid passage 156 to pump liquid therethrough. Impeller means 110 may be comprised of a multitude of blades that circumferentially fit around a part of the lower portion of inside reaction vessel 104 and that axially extend upwardly at an angle of approximately 30 degrees to the horizontal. Preferably, there are three or more such impeller blades attached to and uniformly positioned around reaction vessel 104, and these impeller blades extend along only a relatively minor portion of the total axial length of sidewall 154, for example, from a level slightly above the top of liquid inlet 134 of outside containment vessel 102.

Baffle means 112 is secured to outside containment vessel 102 and extends therefrom into liquid passage 156 to retard or brake circumferential movement of the liquid therein around the axis of rotation of reaction vessel 104. By braking this circumferential movement of the liquid in passage 156, baffle means 112 facilitates movement of that liquid inwardly into the interior of reaction vessel 104. Baffle means 112 may be comprised of a multitude of separate baffle plates that extend substantially directly vertically or axially along the inside surface of sidewall 122 of the outside containment vessel 102. Preferably there are three or more such baffle plates attached to and uniformly spaced around containment vessel 102, and these baffle plates extend along a major portion of the axial length of sidewall 154, for example from a level slightly above the top of impeller means 110 to a position just below top plate 116.

Inside upper ring 126 of outside containment vessel 102 is secured to top plate 116, generally coaxial therewith, and extends downward from the top plate, directly above sidewall 154 of inside reaction vessel 104, to a position slightly spaced from that sidewall. In this way, upper ring 126 and sidewall 154 form disc shaped channel 160 in communication with the interior of reaction vessel 104 to limit the rate at which liquid passes thereinto. This limit on the rate at which liquid passes into the interior of reaction vessel 104 can be changed by changing the size of the opening of channel 160; and this can be done by replacing either ring 126 or ring 124 with another ring of a different axial thickness. Upper ring 126 may be formed from a variety of materials and may be secured in place in a variety of ways. For instance, ring 126 may be made from plexiglass and bolted to the top plate 116 of containment vessel 102.

Liquid guide means 130 extends into liquid inlet 146 of inside reaction vessel 104 to direct liquid entering that vessel against the inside surface of sidewall 154. Preferably, liquid guide means 130 has a cylindrical shape and extends an appreciable distance both above and below the top level of inside reaction vessel 104. Any suitable material such as acrylic may be used to make liquid guide means 130. Seal 132, which may be a conventional o-ring, extends around guide means 130, partly within a groove formed in the inside annular surface of ring 126, in pressure engagement with the liquid guide means and inside ring 126. This pressure engagement seals the space between ring 126 and guide means 130. Liquid guide means 130 is further secured in place by means of a plurality of screws (not shown) pressing against ring 126.

Gas conduit means 106 extends through outside containment vessel 102, specifically opening 140 thereof, and into the interior of inside reaction vessel 104 to conduct gas thereinto. Conduit means 106 may be secured in place in any suitable way, for example by a pressure fit between the gas conduit means and the surfaces of top plate 116 forming opening 140. Preferably, gas conduit means 106 includes tube 162, which extends through top plate 116, and baffle plate 164, which is secured to and extends outward from tube 162 within inside reaction vessel 104. Tube 162 conducts gas into the interior of inside reaction vessel 104, and baffle plate 164 directs the gas radially outward from the bottom of tube 162 to facilitate mixing that gas with liquid on the inside surface of sidewall 154 of the inside reaction vessel.

Drive means 114 is connected to inside reaction vessel 104 to rotate that vessel about axis 144. As will be understood by those skilled in the art, numerous drive means may be employed in the practice of this invention. For instance, as shown in FIG. 1, drive means 114 may comprise a conventional drive shaft having a first end rigidly secured to inside reaction vessel 104, extending through opening 142 of outside containment vessel 102, and having a second end adapted to be connected to an electric motor. A seal, which also may be a conventional o-ring, extends around the drive shaft, within a groove form in the surface of bottom plate 120 forming drive shaft opening 142, to seal the space between the drive shaft and the bottom plate of outside containment vessel 102.

Alternately, it should be observed, the drive means 114 may comprise a metal plate secured to or embedded in reaction vessel 104 and which, in operation, is employed to electro-magnetically couple the inside reaction vessel to an electro-magnetic force generated outside the containment vessel 102 to rotate the reaction vessel. This latter 0 arrangement would eliminate the need to form drive shaft opening 140 in outside containment vessel 102 and, of course, the need to seal the space between outside containment vessel and drive shaft 114.

In operation, drive means 114 is activated to rotate reaction vessel 104, a liquid is conducted into outside containment vessel 102 via inlet 134 and a gas is conducted into the inside reaction via gas conduit means 106. Rotation of inside reaction vessel 104 rotates impeller means 110, and rotation of the impeller means pumps liquid in fluid passage 156 upward therethrough, through channel 160, and into the interior of reaction vessel 104. Guide means 130 directs that liquid downward and along an inside surface of inside reaction 104, specifically the inside surface of sidewall 154.

The spinning of inside reaction vessel 104 also produces outwardly directed centrifugal forces on the liquid therein, pressing that liquid against the inside surface of the inside reaction vessel. As a result of these forces, that liquid is pressed into and maintained in a simple, smooth cylindrical shape, against the inside surface of inside reaction vessel 104. The centrifugal force field developed within reaction vessel 104 subdues, if not totally prevents, the formation of ripples, waves and other instability phenomena on the surface of the liquid in the reaction vessel.

The gas from conduit means 106 flows outward from the bottom thereof and comes into contact with the smooth surface of the liquid film formed on the inside surface of reaction vessel 104. Because of the smooth surface and simple geometry of the liquid film in reaction vessel 104, the reactions between the gas and the liquid in that vessel are relatively simple to quantify and mathematically analyze. Also, stationary baffle 164 in reaction vessel 104 inhibits or retards circumferential movement of gas therein.

Gas passes upward through inside reaction vessel 104, through the open top thereof, and is discharged from outside containment vessel 102 via outlet 166. Liquid flows downward through inside reaction vessel 104 and is discharged therefrom via outlet 150. A portion of this liquid is discharged from outside vessel 102 via outlet 136, and another portion of this liquid is recirculated to liquid inlet 146 by impeller means 110. Impeller means 110 also mixes this recirculated liquid, as well as the liquid passing into liquid passage 156 directly from inlet 134 of outside containment vessel 102. This insures that the bulk properties of the liquid composition in reactor 100 remain uniform, and thereby facilitates analysis of the chemical reactions occurring in the reactor 100.

Figure 2:
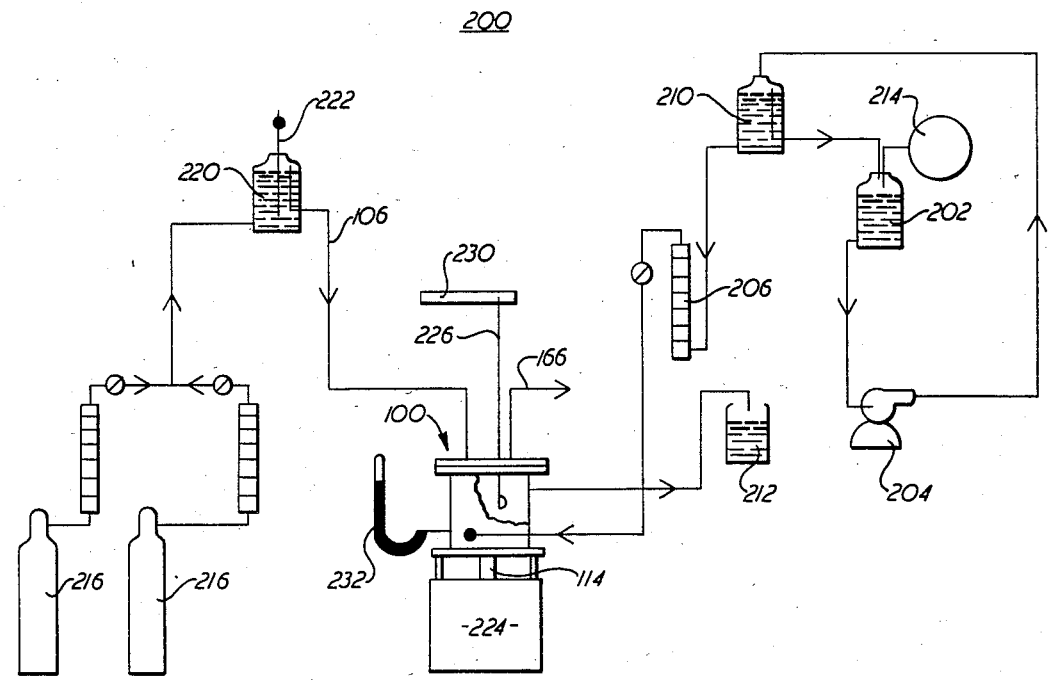
FIG. 2 is a schematic drawing of a laboratory system employing the reactor shown in FIG. 1.

FIG. 2 schematically shows system 200 in which reactor 100 is used, and in particular, shows the auxiliary equipment for using the reactor 100 in a laboratory experiment. Liquid is provided from supply tank 202 via pump 204. The inlet flow rate of liquid to reactor 100 is measured by means of rotameter 206 and is maintained substantially constant by the use of constant head tank 210. Liquid discharged from reactor 100 is accumulated in collector 212. A vent on liquid supply tank 202 is covered with balloon 214 filled with pure gas to prevent atmospheric gasses from contaminating reactor 100.

Gas is supplied from gas supply tanks 216. The dry gas from tanks 216 is saturated with an inert liquid and heated to the temperature of reactor 100 by bubbling the gas through a one liter liquid bath 220 maintained at a constant temperature by immersion heater 222. The saturated gas then enters reactor 100 through gas conduit means 106, and exits the reactor vessel through gas outlet 166. Prior to operation of reactor 100, a solid component, which may be either a third reactant or a catalyst, may be coated on the inside wall of reaction vessel 104 or located between the inside reaction vessel and outside containment vessel 102. A conventional electric motor 224 is provided to rotate drive shaft 114 and, thereby, cause inside reaction vessel 104 to rotate. Motor 224 also supports reactor 100.

During operation, at least 25 to 30 minutes are allowed for reactor 100 to reach constant temperature and outlet concentrations for given operating conditions. Analytical instruments (not shown) are used to monitor changes in the concentration of gas and liquid in reactor 100 and thus to indicate when a steady state has been reached.

During initial operation of reactor 100, the temperature of the reactor increased from 3° C. to 25° C. above ambient temperature. This temperature increase has been found to be greater with greater rotational speed of inside reaction vessel 104 and therefore is believed to be due to fluid friction in reactor 100. The excellent fluid mixing in reactor 100 produces a uniform temperature therewithin, however, so that the temperature increase due to internal fluid friction has no detrimental effect on any experiment as long as physical constants are corrected for the increased temperature. Temperature is measured to 0.5° C. via an iron-constantine thermal couple (not shown) inserted into the bulk liquid in reactor 100.

The thickness of the liquid film inside reactor 100 is measured by means of rod 226 attached to a pivot on the top of the reactor. In particular, a micrometer caliper scale 230 is used to measure the horizontal displacement of a top end of rod 226 to within ±0.001 inch, and the actual film thickness is estimated by means of a similar triangle analysis. Since the angle of deflection of rod 226 is small, a similar triangle analysis produces a very accurate and reliable estimate of the actual thickness of the film in reactor 100.

The thickness of the liquid film in reactor 100 depends, in part, on the rotational speed of inside reaction vessel 104 and, in part, on the pressure at liquid outlet 136. To elaborate, the thickness of the film at a given rotational speed is directly dependent on the pressure in reactor 100. This pressure, which is measured by manometer 232, increases or decreases directly with the pressure of liquid at outlet 136.

Conventional techniques are used to analyze the chemical composition of the fluids in or discharged from reactor 100. This information and a quantitative analysis of the fluid flow through and reactions in reactor 100 are then used to develop a thorough understanding of the chemical processes occurring in the reactor.

Although described in a laboratory environment for experimental purposes, it will be understood that reactor 100 may also be used, with changes well within the purview of those of ordinary skill in the art, in a commercial or industrial application.

Figure 3:
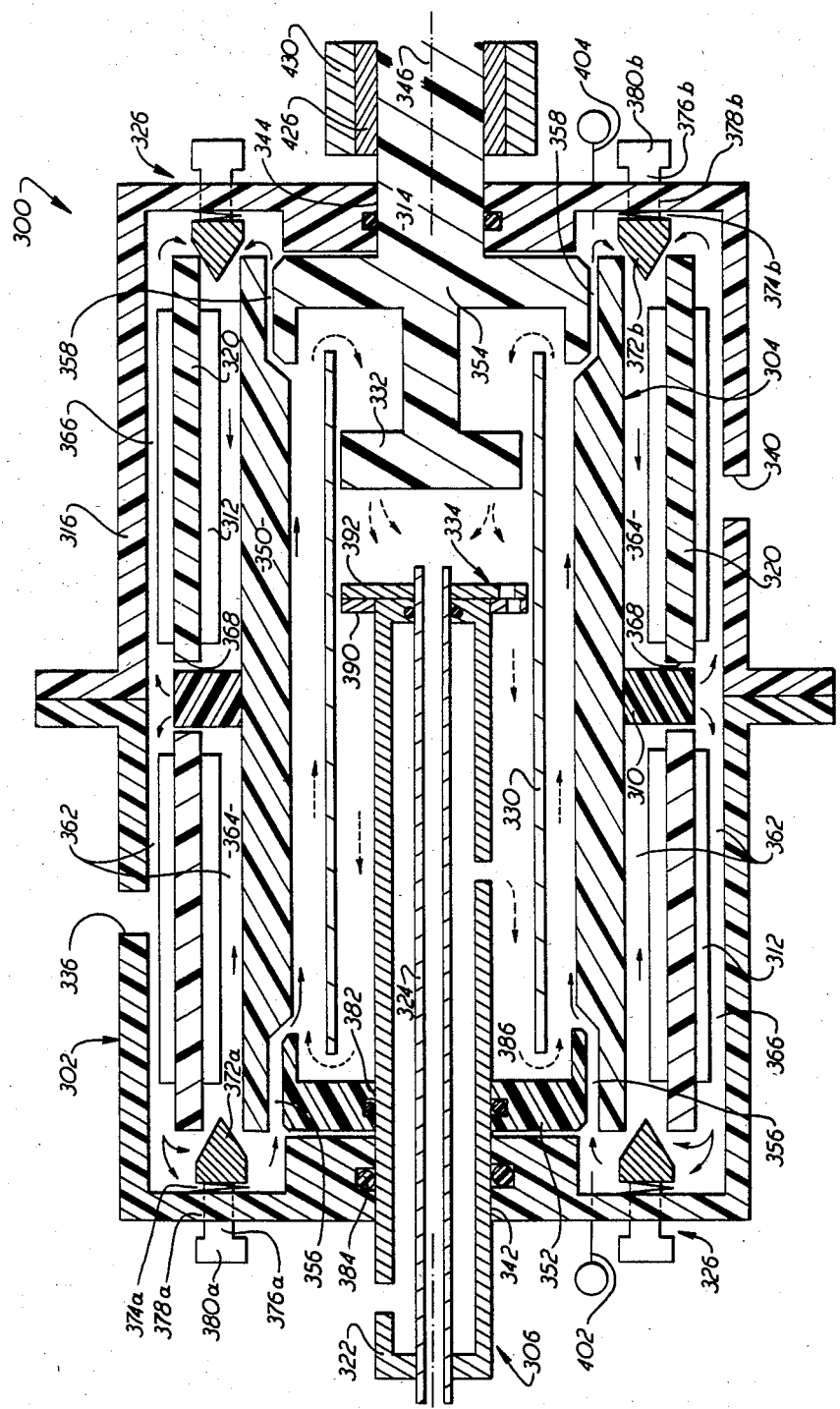
FIG. 3 is an axial cross-sectional view through a reactor illustrating a second embodiment of this invention.

FIG. 3 illustrates a second embodiment 300 of the gas-liquid reactor of this invention. This embodiment, similar to embodiment 100, includes outside containment vessel 302, inside reaction vessel 304, gas conduit means 306, impeller means 310, baffle means 312, and drive means 314. With this embodiment, outside containment vessel 302 includes housing 316 and liquid flow guide 320, and gas conduit means 306 includes inlet tube 322 and outlet tube 324. Gas-liquid reactor 300 also includes liquid film flow control means 326, gas flow guide 330, gas propeller 332, and gas flow control means 334.

Housing 316 of containment vessel 302 is comprised of separate left and right sections that are bolted together along contiguous flanges to form a substantially enclosed, cylindrically-shaped protective cover for reactor 300. As will be understood by those skilled in the art, the left and right sections of containment vessel housing 316 may be connected together in other suitable ways and may have shapes and sizes other than as shown in FIG. 3. Housing 316 forms liquid outlet and inlet openings 336 and 340, a combined gas inlet and outlet opening 342, and a drive shaft opening 344. Housing 316 may be formed from a transparent material to facilitate observation of the reactions occurring therein, or the housing may be made from a metal, which would allow operation at higher temperatures and pressures.

Figure 4:
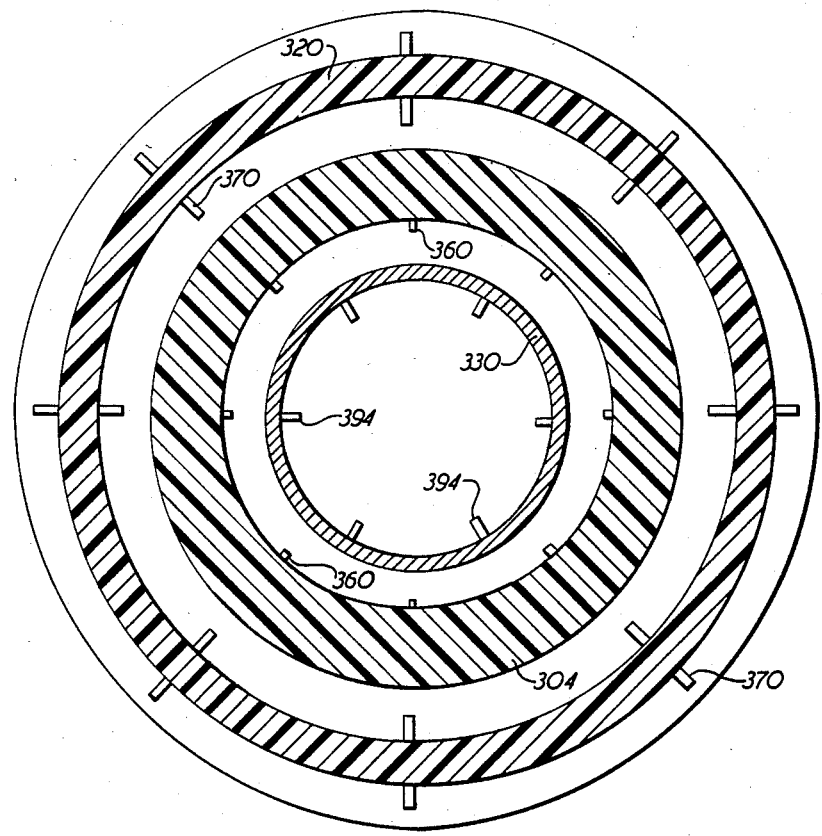
FIG. 4 is a transverse sectional view through the reactor shown in FIG. 3.

Inside reaction vessel 304 is supported within housing 316 for rotation about axis 346, and has a substantially closed, cylindrical shape, including axial sidewall 350, left wall 352, and right wall 354. Left wall 352 and sidewall 350 are spaced apart and connected together by a plurality of mitered bars. These bars are themselves slightly spaced from each other forming, in combination with left wall 352 and sidewall 350, liquid inlet 356. Similarly, right wall 354 and sidewall 350 are slightly spaced apart and connected together by a plurality of mitered bars that are slightly spaced apart from each other to form, with right wall 354 and sidewall 350, liquid outlet 358. With reference to FIG. 4, a plurality of axial baffle plates 360 may be installed on the inside surface of inside reaction vessel 304 to assist further stabilizing the liquid flow therethrough.

Reaction vessel 304 may be formed from a transparent material to allow observations of the reactions occurring therein. Alternately, in case it is preferred to operate vessel 304 at higher pressures and temperatures, the inside reaction vessel may be formed from a metal. Reaction vessel 304 may be rotated about a horizontal axis, about a vertical axis, or about any other axis at a predetermined angle to the horizon. Rotation about a horizontal axis is usually preferred, unless the liquid used in reactor 300 is extremely viscous.

Outside containment vessel 302 and inside reaction vessel 304 form liquid passage 362 analogous to liquid passage 156 of reactor 100. With reactor 300, however, liquid flow guide 320 is located in liquid passage 362 and separates that passage into inside and outside portions 364 and 366. Flow guide 320 forms a central radial opening 368 to conduct liquid between the inside and outside portions of liquid passage 362. At the same time, axial ends of liquid flow guide 320 are spaced from housing 316 to form radial flow passages for conducting fluid from outside portion 366 of liquid passage 362 to inside portion 364 thereof or to inlet 356 of inside reaction vessel 304. Preferably, flow guide 320 is comprised of a pair of axially spaced, aligned cylindrical shells, with the axial space between those shells forming opening 368. Flow guide 320 may be secured in liquid passage 362 in any suitable way, for instance by a plurality of brackets or studs (not shown) securely connecting the shells of the flow guide to containment vessel housing 316.

With reactor 300, impeller means 310 are positioned and operated to draw liquid from inside portions 364 of liquid fluid passage 362 and to direct the liquid outward through central opening 368 of liquid flow guide 320 into outside portion 366 of the liquid fluid passage. More particularly, impeller means 310 includes a plurality of impeller blades secured to inside reaction vessel 304 and extending therefrom across inside portion 364 of liquid passage 362 and into central opening 368 of liquid flow guide 320.

In addition, with embodiment 300, baffle means 312 are secured to liquid flow guide 320 and extend both radially inward and outward therefrom to brake circumferential movement of liquid within liquid passage 362. As depicted in FIG. 4, baffle means 312 may comprise a series of separate plates 370 secured to and extending from surfaces of liquid flow guide 320.

Liquid film flow control means 326 is located adjacent inside reaction vessel 304 to vary the pressure of the liquid at inlet 356 as well as at outlet 358, and, thus, the liquid film flow rate through the inside reaction vessel, and the liquid film flow control means includes left and right control rings 372a and 372b. Left control ring 372a extends around inside reaction vessel 304 adjacent liquid inlet 356 thereto and is supported for axial movement relative to inlet 356 to control the quantity of liquid conducted thereinto. Control ring 372a directs a first part of the liquid leaving the left end of outside portion 366 of liquid passage 362 into liquid inlet 356 of reaction vessel 304, and directs a second part of the liquid from that end of the outside portion of the liquid passage into inside portion 364 of the liquid passage.

With reference to FIG. 3, at a given rotational speed of vessel 304 and, thus, a given impeller discharge pressure, moving ring 372a to the right, toward liquid flow guide 320, increases the amount of liquid that is directed into liquid inlet 356 of reaction vessel 304. This increases the liquid pressure at inlet 356 and increases the rate at which liquid flows through reaction vessel 304. Conversely, moving ring 372a to the left, away from liquid flow guide 320, decreases the amount of the liquid from outside portion 366 of liquid passage 362 that is directed into inlet 356 of vessel 304. This decreases the liquid pressure at inlet 356 and the rate at which liquid flows through reaction vessel 304.

Right control ring 372b extends around inside reaction vessel 304 adjacent liquid outlet 358 thereof and is supported for axial movement relative to outlet 358. Moving ring 372b away from liquid flow guide 320 facilitates the discharge of liquid through liquid outlet 358 thereby reducing the pressure there at. In contrast, moving ring 372b toward liquid flow guide 320 increases the pressure at outlet 358 and thus reduces the liquid pressure drop across inside reaction vessel 304.

Control rings 372a and 372b are supported for axial movement within housing 316 by a plurality of tension springs and threaded stems. For instance, tension springs 374a are disposed within housing 316, axially between left control ring 372a and the left wall of containment vessel housing 316. First axial ends of these tension springs 374a are secured to left control ring 372a so that those springs urge that ring toward the left wall of housing 316. Stems 376a extend through threaded openings 378a in the left wall of housing 316, into abutting contact with left control ring 372a. By rotating stems 376a in a first direction, the stems are moved to the right as viewed in FIG. 3, forcing left control ring 372a toward liquid flow guide 320. When stems 376a are rotated in a second, opposite direction, the stems move to the left as viewed in FIG. 3, and tension springs 374a pull left control ring 372a to the left, toward the left wall of housing 316. Handles 380a are provided to help rotate stems 376a.

A second set of tension springs 374b, threaded stems 376b, threaded housing openings 378b, and handles 380b are provided to support and to move right control ring 372b within housing 316 in a manner similar to the way in which springs 374b, stems 376a and handles 378a are used to support and move ring 372a in the containment vessel housing.

Gas inlet tube 322 of gas conduit means 306 extends through opening 342 of outside containment vessel 302 and through opening 382 of inside reaction vessel 304 to conduct gas thereinto. With the embodiment of the invention illustrated in FIG. 3, gas is discharged from inlet tube 322 and into the middle portion of inside reaction vessel 304 via a discharge opening in the sidewall of the inlet tube. Seals 384 and 386 may be used to seal the spaces or interfaces between, respectively, the surfaces of housing 316 forming opening 342 and gas inlet tube 322, and between the gas inlet tube and the surfaces of vessel 304 forming opening 382. Inlet tube 322 may be held in place either by pressure engagement between the gas inlet tube and the surfaces forming opening 342, or by pressure engagement between the gas inlet tube and seal 384.

As viewed in FIG. 3, gas outlet tube 324 axially extends through right and left ends of gas inlet tube 322 and has a right, open end in communication with a right portion of the interior of inside reaction vessel 304. Seals are used to prevent gas from passing through the spaces or interfaces between outlet tube 324 and the right and left ends of inlet tube 322. For reasons discussed below, outlet tube 324 may be pivoted or rotated about its longitudinal axia relative to inlet tube 322. It should be noted that, with changes well within the ability of one of ordinary skill in the art, the relationship between inlet and outlet tubes 322 and 324 may be reversed without departing from the scope of this invention. That is, gas may be conducted into reaction vessel 304 by tube 324 and discharged from the inside reaction vessel by means of tube 322.

Gas flow guide 330 is located inside reaction vessel 304 to direct the gas flow therein through a preferred, predetermined pattern. Preferably gas flow guide 330 has a cylindrical shape and is located between and substantially concentric with gas inlet tube 322 and the inside surfaces of inside reaction vessel 304. Flow guide 330 axially extends along at least a major portion of the axial distance between left and right walls 352 and 354 of inside reaction vessel 304. Axial ends of gas flow guide 330 are slightly spaced from walls 352 and 354, however, to allow gas to flow radially past the axial ends of the gas flow guide.

Gas flow control means 334 is located in reaction vessel 304 to control the gas flow rate therethrough. With the embodiment of the invention shown in FIG. 3, gas flow control means 334 comprises first plate 390, which is connected to gas tube 322 and radially extends outward therefrom, and second plate 392, which is connected to gas tube 324 and radially extends outward from that tube, immediately adjacent first plate 390. Plates 390 and 392 radially project across substantially the entire space between gas tube 322 and gas flow guide 330 to control the amount of gas flowing therebetween.

Each plate 390 and 392 defines one or more axial openings, and the openings of these plates are shaped and positioned so that pivoting or rotating second plate 392 relative to first plate 390 varies the size of axially aligned portions of the axial openings through those plates. Reducing the size of the axially aligned portions of these openings decreases the amount of gas passing through plates 390 and 392, decreasing the gas flow rate through inside reaction vessel 304. Conversely, increasing the size of the axially aligned portions of the openings through plates 390 and 392 increases the quantity of gas passing through those plates, increasing the gas flow rate through reaction vessel 304.

With reactor vessel 300, drive means 314 is integrally formed with right wall 354 of inside reaction vessel 304 and extends therefrom, through opening 344 of outside containment vessel 302 for connection to, for example, an electric motor. An o-ring extends around drive means 314, within a groove made in the surfaces forming opening 344, to seal the space between that surface and the drive means 314.

In operation, drive means 314 is utilized to rotate reaction vessel 304, a liquid is conducted into outside containment vessel 302 via inlet 340, and a gas is conducted into the inside reaction vessel via gas conduit means 306. Rotation of inside reaction vessel 304 rotates impeller means 310; and as a result of the movement and positioning of the impeller means and the shape and position of liquid flow guide 320, a double loop liquid flow path develops in liquid passage 362. As shown by the full line arrows in FIG. 3, liquid flows to the right through the right half of outside portion 366 of liquid passage 362, and to the left through the right half of inside portion 364 of liquid passage 362. At the same time, liquid flows to the left through the left half of outside portion 366 of liquid fluid passage 362, and to the right through the left half of inside portion 364 of liquid passage 362. A portion of the liquid passing radially inward past the left end of liquid flow guide 320 is conducted into inlet 356 of inside reaction vessel 304, and left wall 352 thereof directs that liquid against the inside, axially extending surface of the inside reaction vessel.

The spinning of inside reaction vessel 304 produces outwardly directed centrifugal forces on the liquid therein, pressing that liquid against the inside surface of the inside reaction vessel. As a result of these forces, that liquid is pressed into and maintained in a simple, smooth cylindrical shape against the inside surface of inside reaction vessel 304. The centrifugal force field developed within inside reaction vessel 304 substantially, if not totally, prevents the development of ripples and other instabilities on the surface of the liquid in the inside reaction vessel.

Liquid flows through inside reaction vessel 304 and is discharged therefrom via outlet 358. This liquid is drawn from the right half of inside portion 364 of liquid passage 362 and then forced radially outward through central opening 368. A portion of this liquid is discharged from containment vessel 302 via liquid outlet 336 and another portion of this liquid is recirculated through liquid passage 362 and into inside reaction vessel 304. The movement of liquid through passage 362 and the pumping of the liquid by impeller means 310 thoroughly mixes the liquid in reactor 300, insuring that the bulk properties of the liquid are substantially uniform in reactor 300.

As shown by the broken line arrows in FIG. 3, gas flows to the left from the discharge opening in inlet tube 322, around the left axial end of gas flow guide 330, and then to the right, past the outside of the gas flow guide and in contact with the smooth surface of the liquid film formed on the inside surface of reaction vessel 304. Because of the smooth surface and the simple geometry of the liquid film in inside reaction vessel 304, the reactions between the gas and the liquid in the inside reaction vessel are comparatively simple to analyze quantitatively.

Gas flows radially inward, around the right end of gas flow guide 330, and then toward gas flow control plates 390 and 392. Some of this gas is discharged from containment vessel 302, through discharge tube 324, and some of this gas passes through plates 390 and 392 and is recirculated around gas flow guide 330 and through vessel 304. The amount of the gas discharged from vessel 304 and the amount of the gas that is recirculated therethrough are determined by the size of the axially aligned portions of the axial openings through plates 390 and 392.

Gas propeller 332, which is shown as integral with drive means 314, is located in reaction vessel 304 to propel the gas therethrough and to mix the gas in the inside reaction vessel. This mixing maintains the bulk properties of the gas uniform within inside reaction vessel 304. It should be observed that, because of the strong centrifugal forces applied to the liquid in reaction vessel 304, the gas therein may be uniformly mixed without causing any significant deformation of the surface of the liquid film in the reaction vessel. As illustrated in FIG. 4, a plurality of gas baffles 394 may be secured to and radially extend outward from one or both sides of gas flow guide 330 to inhibit or prevent spinning movement of the gas inside reaction vessel 304.

Figure 5:
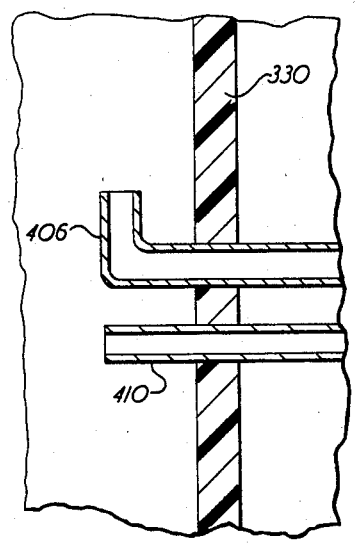
FIG. 5 is an enlarged view of a portion of the reactor shown in FIG. 3, illustrating a pitot tube of that reactor in greater detail.

Conventional pressure transducers 402 and 404 are used to measure the pressure at the liquid inlet and outlet 356 and 358, respectively, of inside reaction vessel 304. A pitot tube 406, shown in FIG. 5, is used to measure the velocity of the gas over the thin liquid film in inside reaction vessel 304. More particularly, as shown in Figure 5, pitot and static tubes 406 and 410 extend into the gas flow path radially outside gas flow guide 330, with an open end of the pitot tube facing upstream of that flow path, and with an open end of the static tube facing a direction perpendicular to the gas flow therepast. Pitot and static tubes 406 and 410 extend from a position radially outside gas flow guide 330, through that gas flow guide, and then through gas tube 322 to a conventional differential pressure transducer or manometer located outside reactor 300.

Figure 6:
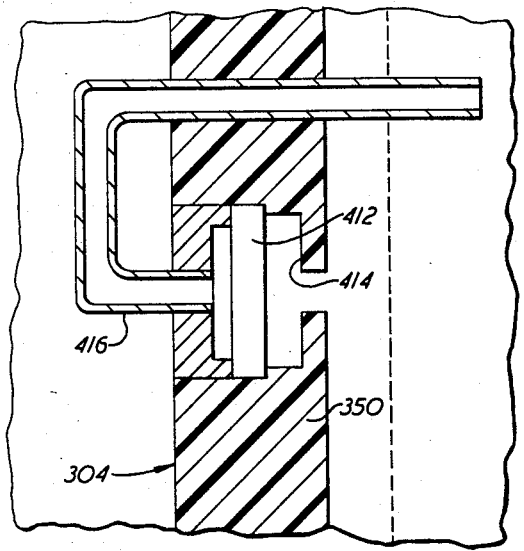
FIG. 6 is an enlarged view of a part of the reactor illustrated in FIG. 3, showing a pressure transducer used in that reactor.

With reference to FIG. 6, the thickness of the liquid film (shown in broken lines) against the inside surface of reaction vessel 304 is measured by means of a pair of differential micro-pressure transducers located in recesses inside the axial sidewall 350 of reaction vessel 304 and in fluid communication with the liquid film in the inside reaction vessel. FIG. 6 shows one such transducer 412 held within recess 414 of sidewall 350. A first side of transducer 412 faces the interior of reaction vessel 304; and, in practice transducer 412 measures the sum of the pressure due to the thickness of the liquid film and that of the liquid in recess 414. With known geometries of reaction vessel 304 and recess 414, a known speed of rotation, and a known density of the liquid, the pressure data from transducer 412 can be further converted to determine the thickness of the liquid film.

Of course, when vessel 304 is rotated about a horizontal axis, gravity has a fluctuating effect on the pressure measured by transducer 412. This effect also can be calculated and the raw signal obtained from transducer 412 suitably modified to compensate for that effect. For instance, the transducers used to measure the liquid film thickness in vessel 304 may be located diametrically opposite each other, so that gravity always has opposite effects on the transducers, and the thickness of the liquid film in vessel 304 determined by considering the average of the two pressure sensed by the transducers. Gravity fluctuations may also be substantially smoothed out by means of an electronic filter connected to the transducers and having a cut-off frequency approximately half the rotational frequency of vessel 304. The effect of the static vapor pressure inside reaction vessel 304 on transducer 412 can be countered by means of a pressure tap 416, which extends between a second side of the transducer and the gas in the reaction vessel 304 to apply a pressure on that second side of the transducer equal to the static gas pressure in reaction vessel 304.

The film flow rate through inside reaction vessel 304 is measured by means of a pair of detectors (not shown) located at the liquid inlet 356 and outlet 358 of the inside reaction vessel. For example, these detectors may be electrical conductivity probes, and the film flow rate through reaction vessel 304 may be measured by injecting a slug of a highly ionizable salt, such as potassium chloride, at inlet 356, and measuring the time the slug takes to pass between the detectors. This elapsed time is directly related to the film flow rate through inside reaction vessel 304.

Figure 7:
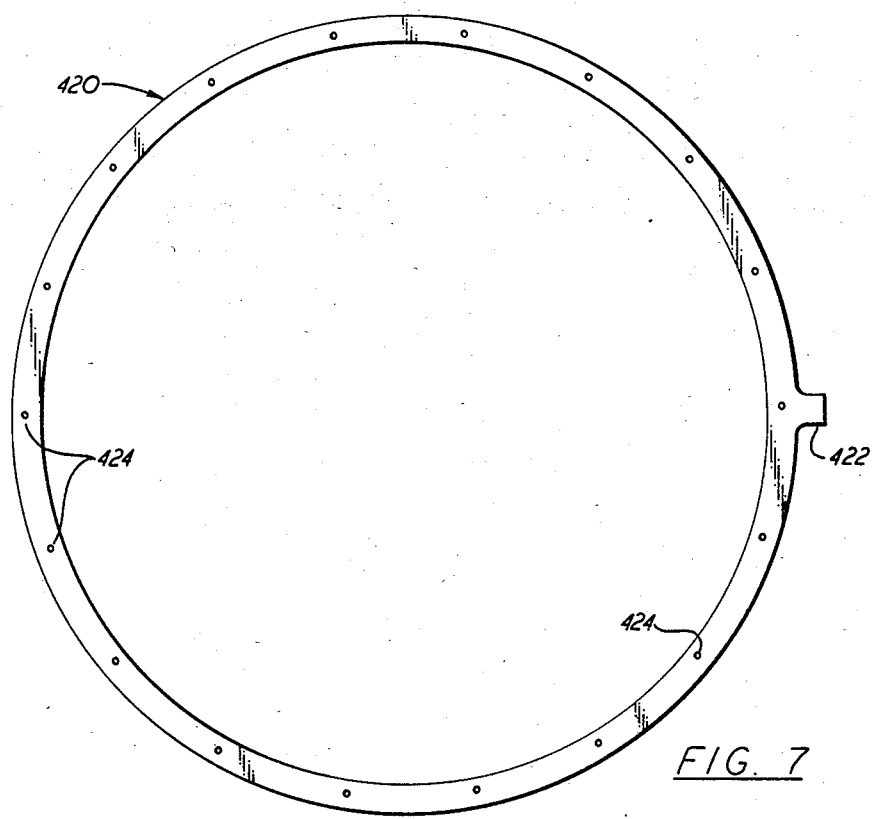
FIG. 7 shows a liquid inlet manifold that may be used with the reactor depicted in FIG. 3.

With reference to FIG. 7, a ring shaped manifold 420, having inlet 422 and a multitude of outlets 424 may be used to help distribute liquid uniformly around liquid passage 362. In use, manifold 420 is located in liquid passage 362, around liquid flow guide 320, with manifold inlet 422 extending into or through containment vessel inlet 340. A liquid feed line (not shown) is connected to manifold inlet 422 and conducts liquid into the interior thereof. The manifold conducts liquid around liquid passage 362, with manifold outlets 424 distributing the liquid uniformly around the outside portion of the liquid passage. A similar manifold may be positioned around liquid flow guide 320, adjacent liquid outlet 336, to collect liquid in and to discharge liquid from outside portion 366 of liquid fluid passage 362.

All electrical connections to and from the electrical components mounted in or on inside reaction vessel 304 are made by means of slip rings 426 and 430. Ring 426 is mounted on drive means 312 and rotates therewith, and ring 430 is mounted on a stationary external support frame (not shown) so that the latter ring can rotate while ring 430 remains stationary relative to outside containment vessel 302. A plurality of wires are connected to inside ring 426 and extend therefrom, through grooves (not shown) formed in drive means 314, and to the electrical components in or on reaction vessel 304. Ring 430 is connected to an electric current source in any conventional manner, and current is conducted to and from the electrical components in or on reaction vessel 304 via ring 430 and the electrical conductors extending through drive means 314.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method comprising reacting liquids and gases over a substantially constant size surface area, by
   directing a liquid into a rotatable reaction vessel;
   rotating the reaction vessel to force liquid therein against an inside surface of the reaction vessel and into a thin liquid film having a stable shape and a smooth, substantially constant size surface area;
   directing a gas into the reaction vessel to react with the liquid film over the substantially constant size surface area to facilitate analyzing the gas-liquid and reactions;
   discharging gas and liquid from the reaction vessel; and
   analyzing the chemical compositions of the gas and liquid discharged from the reaction vessel.

2. A method according to claim 1 wherein the forming step includes the step of forming the liquid into a cylindrical shape.

3. A method according to claim 2 further comprising the step of recirculating a portion of the liquid discharged from the reaction vessel back thereinto.

4. A gas-liquid reactor comprising: means for reacting gases and liquids over a substantially constant size surface area, including,
   an outside containment vessel having a liquid inlet and a liquid outlet;
   an inside reaction vessel supported within the containment vessel for rotation about an axis, and having a liquid inlet and a liquid outlet, the outside containment vessel and the inside reaction vessel forming a liquid passage for conducting liquid from the liquid inlet of the outside containment vessel to the liquid inlet of the inside reaction vessel;
   drive means connected to the inside reaction vessel to rotate the inside reaction vessel, and to subject liquid therein to a centrifugal force field and force the liquid outward against an inside surface of the inside reaction vessel and into a thin liquid film having a substantially constant size surface area;
   gas conduit means extending through the outside containment vessel and into the inside reaction vessel to conduct gas thereinto to react the gas with the liquid over the substantially constant size surface area to facilitate analyzing the gas-liquid reactions; and
   means for receiving and analyzing the chemical compositions of the gas and liquid discharged from the inside reaction vessel.

5. A gas-liquid reactor according to claim 1 further comprising means to monitor the pressure in the inside reaction vessel.

6. A gas-liquid reactor according to claim 5 further comprising means to monitor the thickness of the liquid film against the inside reaction vessel.

7. A gas-liquid reactor vessel comprising:
   an outside containment vessel having a liquid inlet and a liquid outlet;
   an inside reaction vessel supported within the containment vessel for rotation about an axis, and having a liquid inlet and a liquid outlet, the outside containment vessel and the inside reaction vessel forming a liquid passage for conducting liquid from the liquid inlet of the outside containment vessel to the liquid inlet of the inside reaction vessel and from the liquid outlet of the inside reaction vessel to the liquid inlet thereof;

gas conduit means extending through the outside containment vessel into the inside reaction vessel to conduct gas thereinto;

means secured within the outside containment vessel to recirculate liquid from the liquid outlet of the inside reaction vessel to the liquid inlet thereof; and drive means connected to the inside reaction vessel to rotate the inside reaction, and to subject liquid therein to a centrifugal force field and force the liquid outward and into a thin liquid film against an inside surface of the inside reaction vessel.

8. A gas-liquid reactor according to claim 7 wherein the means to recirculate liquid includes:

impeller means secured to the inside reaction vessel for rotation therewith and extending therefrom into the liquid passage to pump liquid therethrough to the liquid inlet of the inside reaction vessel; and liquid baffle means secured to the outside containment vessel and extending therefrom into the liquid passage to brake circumferential movement of liquid therein.

9. A gas-liquid reactor according to claim 1 or claim 8 wherein the outside containment vessel includes guide means extending into the liquid inlet of the inside reaction vessel for directing fluid along an inside surface thereof.

10. A gas-liquid reactor according to claim 9 wherein:

the inside reaction vessel includes an axially extending sidewall;

the outside containment vessel includes a top annular ring extending above the sidewall of the inside reaction vessel; and the annular ring of the outside containment vessel and the sidewall of the inside reaction vessel define a channel in communication with the liquid inlet of the inside reaction vessel to control the amount of liquid conducted thereinto.

11. A gas-liquid reactor according to claim 9 wherein the gas conduit means includes:

a tube extending through the outside containment vessel and into the interior of the inside reaction vessel; and a gas baffle secured to the tube and extending outward therefrom to direct the gas toward the sidewall of the inside reaction vessel.

12. A gas-liquid reactor according to claim 11 wherein the guide means is located adjacent the annular ring of the outside containment vessel; and the outside containment vessel further includes an annular seal located between and in pressure engagement with both the guide means and the annular ring to hold the guide means in place.

13. A gas-liquid reactor according to claim 12 wherein:

the inside reaction vessel includes an axially extending sidewall;

The impeller means includes a plurality of impeller blades uniformally spaced around the circumference of and extending outward from the sidewall; and liquid baffle means includes a plurality of annularly spaced baffle plates extending inward from the outside containment vessel and above the impeller blades.

14. A gas-liquid reactor according to claim 1 or claim 8 wherein the outside containment vessel includes:

an outside housing; and liquid flow guide located in the liquid passage and separating the liquid passage into inside and outside portions; and wherein the liquid flow guide forms a central radial opening to conduct liquid between the inside and outside portions of the liquid passage; and the impeller means draws liquid from the inside portion of the liquid passage and directs the liquid outward through the radial opening of the liquid flow guide and into the outside portion of the liquid passage.

15. A gas-liquid reactor according to claim 14 wherein the impeller means includes a plurality of impeller blades extending across the inside portion of the liquid passage and into the central opening of the liquid flow guide.

16. A gas-liquid reactor according to claim 15 wherein the liquid flow guide has first and second ends axially spaced from the outside housing to conduct liquid radially inward between the outside and inside portions of the liquid passage, and between the outside portion of the liquid passage and the liquid inlet of the inside reaction vessel.

17. A gas-liquid reactor according to claim 14 wherein the liquid baffle means are secured to the liquid flow guide and extend therefrom into the liquid passage.

18. A gas-liquid reactor according to claim 1 or claim 8 further comprising means located adjacent the inside reaction vessel to vary the pressure of the liquid therein and the liquid film flow rate through the inside reaction vessel.

19. A gas-liquid reactor vessel according to claim 18 wherein the means to vary the pressure of the liquid includes:

an inlet control ring extending around the inside reaction vessel adjacent the liquid inlet thereto; and means connected to the outside containment vessel and supporting the inlet ring for axial movement relative to the liquid inlet of the inside reaction vessel to control the quantity of liquid conducted thereinto.

20. A gas-liquid reactor according to claim 19 wherein:

the outside containment vessel includes an outside housing, and a liquid flow guide located in the liquid passage and separating the liquid passage into inside and outside portions;

a first axial end of the liquid flow guide is spaced from the outside housing to form a radial flow path for conducting liquid from the outside portion of the liquid passage into the liquid inlet of the inside reaction vessel; and the inlet control ring is located in the radial flow path to direct a first part of the liquid from the outside portion of the liquid passage into the inside portion of the liquid passage, and to direct a second part of the liquid from the outside portion of the liquid passage into the inlet of the inside reaction vessel, and to control the relative sizes of said first and second parts.

21. A gas-liquid reactor according to claim 1 or claim 8 further comprising means located in the inside reaction vessel and connected to the gas conduit means to control the gas flow rate through the inside reaction vessel.

22. A gas-liquid reactor according to claim 21 wherein the gas flow control means includes:

a gas flow guide located in the inside reaction vessel to direct gas therein through a predetermined pattern;

a first plate secured to the gas flow conduit means, extending radially outward therefrom toward the gas flow guide, and having a first axial opening;

a second plate secured to the gas flow conduit means, extending radially outward therefrom, immediately adjacent the first plate, supported for pivotal movement relative to the first plate and having a second axial opening;

wherein pivoting the second plate relative to the first plate varies the size of axially aligned portions of the first and second openings to control the gas flow rate of gas through the first and second plates.

23. A gas-liquid reactor according to claim 22 wherein:

the gas flow conduit means includes first and second tubes for conducting gas into and from the interior of the inside reaction vessel;

the second tube extends through a bottom of the first tube and is supported for pivotal movement relative to the first tube; and the second gas flow control plate is connected to the second tube for pivotal movement therewith.

24. A gas-liquid reactor according to claim 1 or claim 8 wherein the outside containment vessel includes means supporting the inside reaction vessel for rotation about said axis and relative to the outside containment vessel.

25. A gas-liquid reactor according to claim 7 wherein the thin liquid film has a substantially constant size surface area.

26. A gas liquid reactor according to claim 25 wherein the thin liquid film has a smooth and stable shape.

* * * * *